United States Patent [19]

Beyer

[11] 4,082,179

[45] Apr. 4, 1978

[54] WORKPIECE ELEVATOR

[75] Inventor: Ralph E. Beyer, Fraser, Mich.

[73] Assignee: F. Jos. Lamb Company, Warren, Mich.

[21] Appl. No.: 668,825

[22] Filed: Mar. 22, 1976

[51] Int. Cl.² ............................................. B65G 15/60
[52] U.S. Cl. ..................................... 198/801; 198/836; 198/861
[58] Field of Search ...................... 198/66, 67, 81, 160, 198/168, 171, 198, 367, 476, 796, 733, 735, 801, 836, 861

[56] References Cited

U.S. PATENT DOCUMENTS

| 2,535,866 | 12/1950 | Rasmussen | 198/66 |
| 2,924,325 | 2/1960 | Kay et al. | 198/168 |

Primary Examiner—Evon C. Blunk
Assistant Examiner—Joseph E. Valenza
Attorney, Agent, or Firm—Barnes, Kisselle, Raisch & Choate

[57] ABSTRACT

A workpiece elevator which includes an upright housing in which is arranged a vertically-extending endless conveyor chain having workpiece supports mounted thereon at regularly spaced intervals. The upwardly extending run of the chain is located along the outer face of the front wall of the housing. A guide rail assembly for ascending workpieces carried by the supports on the conveyor chain is constructed so that it can be mounted on or removed from the front wall of the elevator housing as an integral unit.

15 Claims, 4 Drawing Figures

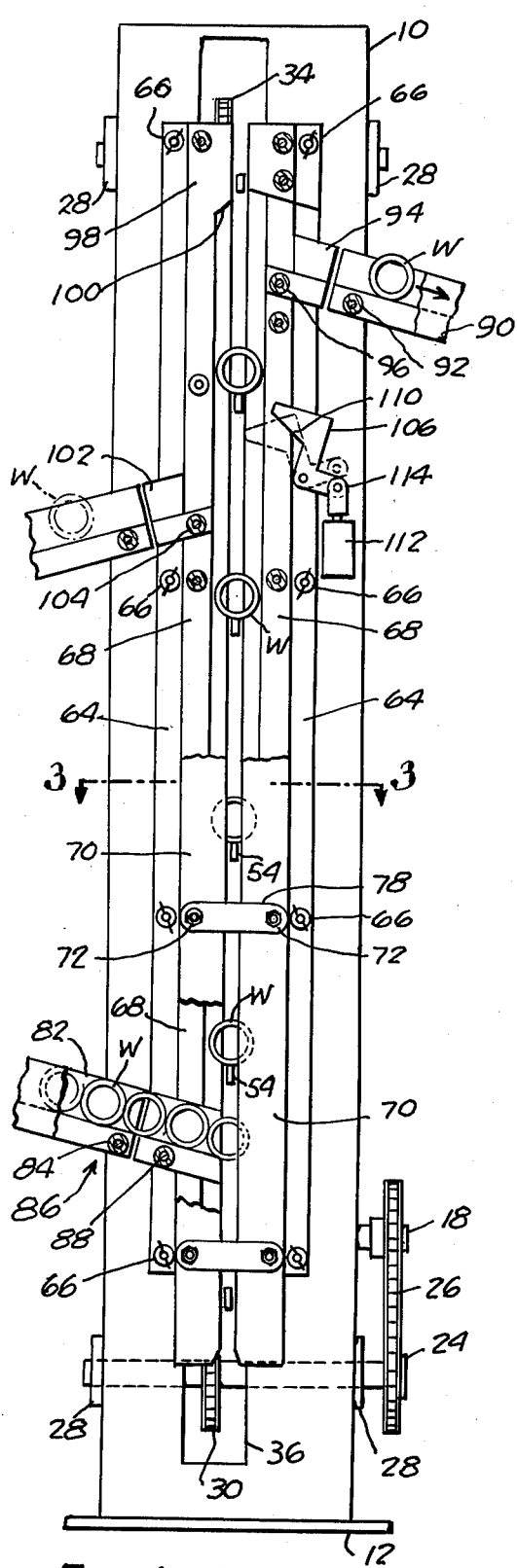
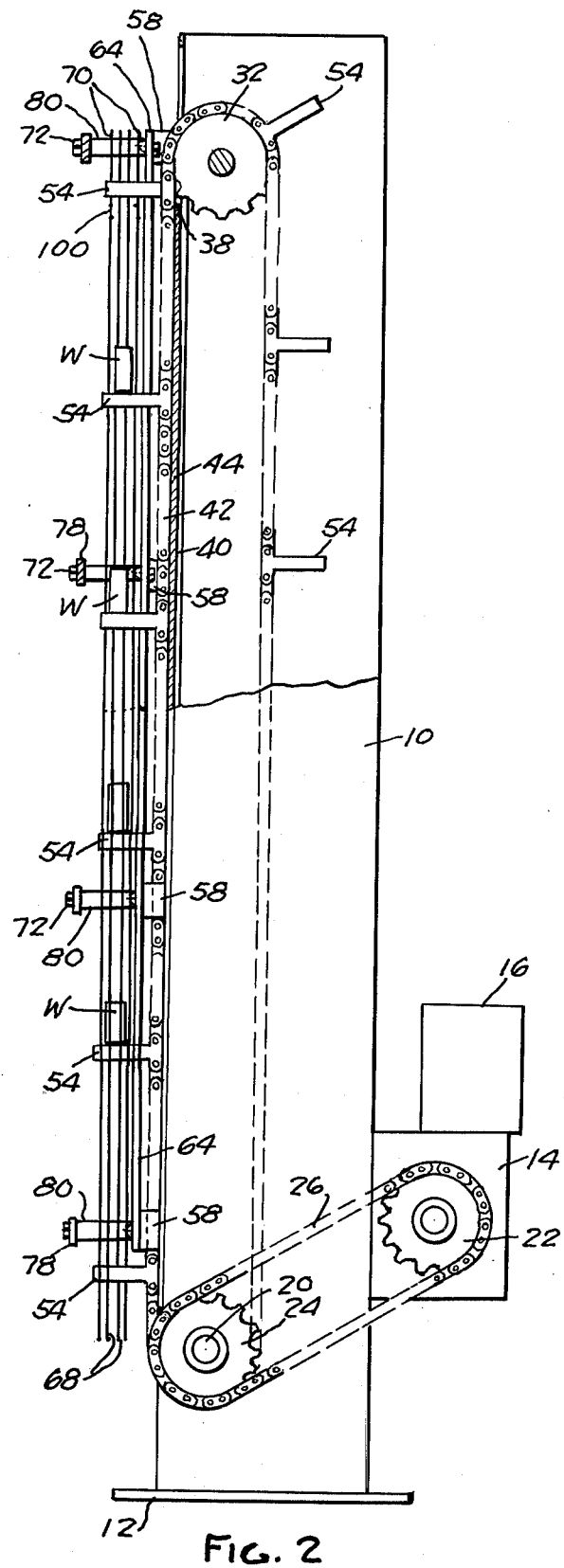
FIG. 1
FIG. 2

WORKPIECE ELEVATOR

This invention relates to workpiece elevators, and, particularly, to elevators of the type generally used in the metal working industry to raise workpieces from a low level to a higher level.

Workpiece elevators of the type to which this invention relates frequently comprise a vertical roller chain loop trained around an idler sprocket and a drive sprocket. The sprockets are supported in a vertically extending elevator frame or housing so that the vertical run of the chain which is travelling upwardly is located on the outside of the housing and the other run on the inside. A plurality of vertically extending workpiece guide rails are mounted on the housing to form a vertical trackway for workpieces supported on blades attached to and spaced along the chain. Means are normally provided at a low level on the elevator to introduce workpieces into the guide rails and additional means are provided at higher levels to remove the workpieces from the elevator.

In many manufacturing facilities using such elevators a variety of workpieces of different widths and diameters are usually made in batches. When the manufacture of a new batch of workpieces is initiated it must be determined if the new workpiece will be satisfactorily accommodated by the elevator and its system of rails, loading and unloading means. If the new workpieces are of substantially different size than the previous batch, the guide rails, loading and unloading means must be changed or replaced to accommodate the new workpieces. Because of the complexity and the number of components employed it is normally laborious and timeconsuming to dismantle the rails, etc. on an elevator and substitute new ones in their place.

The primary object of the present invention is to provide an elevator construction which enables the elevator to be converted to accommodate a different size workpiece in a fast and convenient manner.

A further object of this invention resides in the provision of a guide rail assembly which can be mounted on or removed from an elevator as a single unit.

A further object of the invention resides in the mounting of inlet and exit chutes of the elevator on a guide rail sub-assembly which can be readily removed from or mounted on the elevator housing as an integral unit.

Other objects, features and advantages of the present invention will become apparent from the following description and accompanying drawings, in which:

FIG. 1 is a diagrammatic front elevation, with parts broken away, of a typical workpiece elevator embodying the present invention;

FIG. 2 is a side elevation of the elevator shown in FIG. 1;

Figure 3:
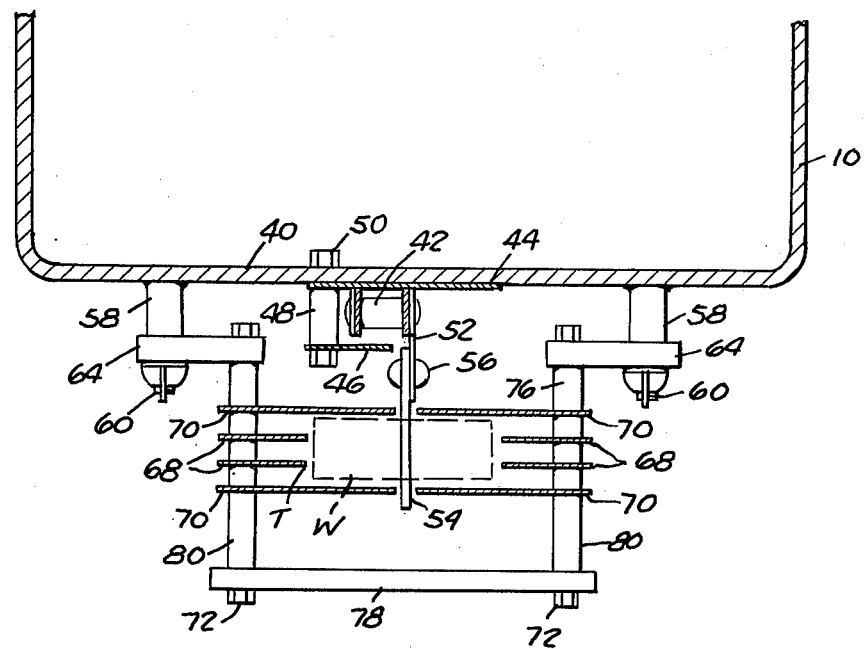
FIG. 3 is a sectional view along the line 3—3 in FIG. 1.

The elevator illustrated in FIGS. 1 and 2 comprises an upright box-like housing or frame 10 mounted on base plate 12. A speed reducer 14 on the back side of housing 10 is driven by a motor 16. The output shaft 18 of speed reducer 14 drives a shaft 20 through sprockets 22,24 and chain 26. Shaft 20 extends horizontally through the lower end of housing 10 and is journalled thereon by bearings 28. Within housing 10 there is keyed to shaft 20 a sprocket 30. An idler sprocket 32 is journalled at the upper end of housing 10 directly above sprocket 30. An endless conveyor chain 34 is trained around these sprockets. Sprockets 30,32 are mounted in housing 10 so that they project through openings 36,38, respectively, in the front wall 40 of the housing. The ascending vertical run 42 of chain 34 extends vertically along the outer face of front wall 40 of housing 10. It will be apparent that this arrangement of the conveyor chain allows the cooperating remaining components of the elevator system to be attached to the outer face of front wall 40 of the elevator housing and renders full safety protection for the descending run of the chain within the elevator housing.

Referring now to FIG. 3, it will be seen that the ascending run 42 of the chain is guided throughout the vertical extent thereof in a guideway defined by wear strips 44,46 on the front wall 40 of the housing. These wear strips are held in spaced apart relation by spacers 48 and are mounted on the front wall 40 by a plurality of vertically spaced bolt and nut assemblies 50. At regularly spaced intervals along the length of chain 34 special links 52 are provided. Links 52 have blade extensions 54 secured thereto as by rivets 56. Blade extensions 54 extend horizontally outwardly from wall 40. On the front wall 40 of housing 10 there is welded two sets of spacer bars 58 which are spaced laterally outwardly from the opposite sides of the vertical run 42 of the conveyor chain. Each of these spacer bars has a threaded stud 60 at the outer end thereof. A guide rail assembly 62 is mounted on spacers 58.

Guide rail assembly 62 comprises a pair of vertically extending support bars 64 which are apertured to receive studs 60. Support bars 64 are rigidly secured to the outer ends of spacer bars 58 by wing nuts 66. A plurality of guide rails 68 and retaining rails 70 are mounted on each of the support bars 64 by bolt and nut assemblies 72. These rails are spaced apart by tubular spacers 74 and are spaced outwardly from support bars 64 by spacers 76. The two sets of rails are held in fixed spaced apart relation by tie bars 78 which are secured in place by the bolt and nut assemblies 72. Tie bars 78 are spaced outwardly beyond the outer ends of blades 54 by tubular spacers 80. The two sets of rails 68,70 define a vertical trackway T for workpieces W supported on blades 54.

Referring to FIG. 1, near the lower end of the elevator the terminal end of a downwardly inclined gravity chuting 82 is secured to frame 10 by suitable fastening means 84. An inlet chute 86 is aligned with chuting 82 and is mounted on the vertical support bar 64 at the left by a suitable fastener 88. A series of workpieces W is shown in the chutes, the lowermost workpiece resting against guide rails 68. A workpiece W is shown supported on each of the blades 54 above chute 86. Adjacent the upper end of the elevator there is arranged another gravity chute 90 which is inclined downwardly from the elevator and which is secured to frame 10 by suitable fastening means 92. An exit chute 94 is aligned with chute 90 and is secured to the support bar 64 at the right by means of suitable fastening means 96. Adjacent the upper end of the elevator and opposite chute 94 cam rails 98 are mounted on support bar 64. Cam rails 98 are formed with a deflector shoulder 100 for camming the workpieces into exit chute 94 when the workpieces are elevated to the level of chute 94.

A second exit chute 102 may be mounted on support bar 64 by suitable fastening means 104. Exit chute 102 is spaced vertically between inlet chute 86 and exit chute 94 on the same side of the conveyor chain as inlet chute 86. At each of the inlet and exit chutes the guide rails 68 are cut away to form a passageway through which the workpieces can travel. Any workpiece travelling upwardly beyond exit chute 102 will be discharged into exit chute 94 by reason of the deflector shoulder 100 on cam rail 98. When desired, the workpieces are discharged from the elevator through exit chute 102 by actuating a bell crank 106 pivotally supported on support bar 64 as at 108. Crank 106 is adapted to be rotated in a counterclockwise direction as viewed in FIG. 1 to discharge workpieces through chute 102. One arm of bell crank 106 is provided with a deflector shoulder 110. The other arm of bell crank 106 is connected to the piston of a hydraulic cylinder 112 by a quick disconnect pin 114. Cylinder 112 is mounted on frame 10.

Figure 4:
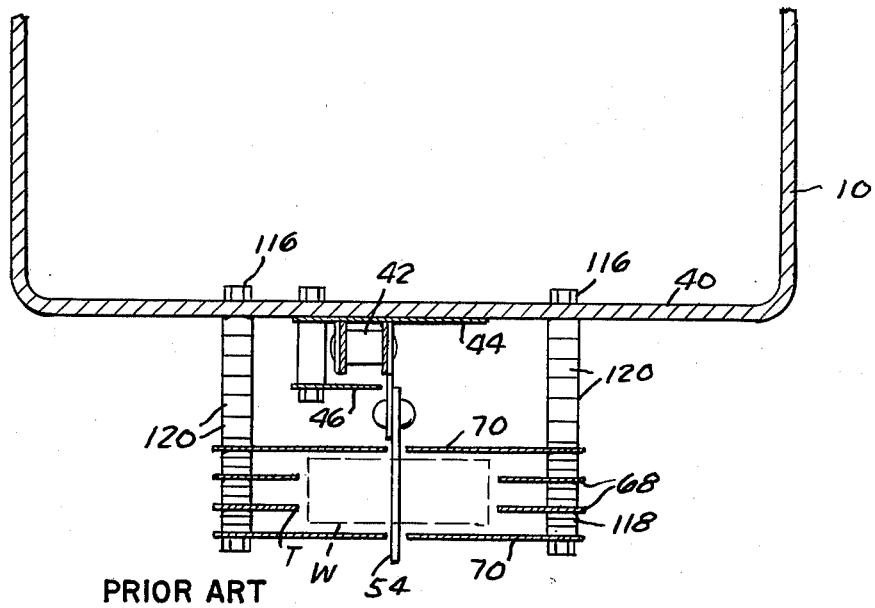
FIG. 4 is a view similar to FIG. 3 and showing the corresponding structure in an elevator of conventional design.

In FIG. 4 there is illustrated a workpiece elevator of conventional design. All of the components of the arrangement illustrated in FIG. 4 are substantially the same as those shown in FIG. 3 with the exception of the manner in which the rails are mounted on frame 10. The arrangement of FIG. 4 is shown to illustrate the utility of the present invention, and, more specifically, the labor-saving feature of the present invention as compared with elevators of conventional construction when the guide and/or retaining rails have to be re-arranged or replaced to accommodate workpieces of different diameter or thickness. In the arrangement shown in FIG. 4 the guide rails 68 and the retainer rails 70 are mounted directly on the front wall 40 of the elevator housing 10 by means of bolt and nut assemblies 116. The spacing between these rails is determined by spacers 118 and the spacing of these rails from front wall 40 is determined by spacers 120, all of which are mounted on front wall 40 by bolt and nut assemblies 116.

With the arrangement shown in FIG. 4, if it becomes necessary to change the dimensions of the trackway T, all of the bolt and nut assemblies 116 must be removed from front wall 40 and spacers 118, 120 and rails 68, 70 must be changed or re-arranged. Obviously all of this disassembly and re-assembly must be performed at the elevator itself. Since the assembly includes many of these rail mountings along the vertical extent of the elevator housing it is obvious that the job of removing, rearranging and changing the components at the site of the elevator is very inconvenient and involves a great deal of time and labor.

Referring now to FIG. 3, it will be seen that, when a change in the dimensions of trackway T is required on an elevator embodying the present invention to accommodate a workpiece of different diameter or different thickness, it is a relatively simple matter to remove wing nuts 66 and thus remove the entire guide rail assembly 62 from the elevator housing. The guide rail assembly 62 can then be replaced with another previously assembled guide rail assembly of similar construction which includes the necessary inlet and exit chutes. In the event that it is desired to merely re-arrange the rails on the guide rail assembly, this operation can be performed at a location specifically suited for assembly and disassembly operations rather than at the site of the elevator housing. Whether the guide rail assembly 62 is replaced with another one or whether the rails thereon are re-arranged, it is obvious that at the site of the elevator the entire assembly 62 is handled as an integral unit and can be readily removed from and mounted on the elevator housing 10. In this connection it will be noted that in removing assembly 62 from housing 10 the bolt and nut assemblies 72 need not be disturbed. Thus, tie bars 78 retain the various components together as an integral unit.

I claim:

1. In a workpiece elevator of the type including an upright housing, sprockets journalled in said housing adjacent the upper and lower ends thereof, an endless conveyor chain trained around said sprockets, the chain having a vertical run disposed along one wall of the housing and a plurality of workpiece supports secured to the chain such that on said vertical run of the chain the supports extend horizontally in a direction outwardly away from said wall of the housing, that improvement which comprises a guide rail assembly removably mounted as an integral unit on said wall of the housing, said guide rail assembly comprising a pair of laterally spaced, vertically extending support bars, a plurality of vertically spaced fastening members securing said support bars on said housing in fixed laterally spaced relation on opposite sides of the support members on said vertical run of the chain, a plurality of vertically extending guide rails mounted directly on each of said support bars by means independent of said fastening members, said guide rails forming a vertically extending trackway for guiding workpieces carried by said work supports and rigid tie bar means independent of said housing and said fastening members connecting said support bars in said fixed laterally spaced relation, said support bars forming the sole means for supporting said guide rail assembly on said housing and said fastening members forming the sole means securing the guide rail assembly to said housing, whereby, upon release of said fastening members, the assembly of said support bars, guide rails and tie bar means can be removed from said housing as an integral assembly.

2. The improvement called for in claim 1 wherein said tie bar means are secured to said means for mounting the guide rails on the support bars.

3. The improvement called for in claim 1 wherein said tie bar means are connected to said support bars by said guide rail mounting means.

4. The improvement called for in claim 1 wherein the means for mounting the guide rails on the support bars comprises a plurality of studs mounted on each of said support bars in vertically spaced relation and extending horizontally in a direction outwardly from said wall of the housing, said tie bar means being mounted on the outer ends of said studs.

5. The improvement called for in claim 1 wherein said fastening members comprise a plurality of threaded anchor members on said wall of the housing.

6. The improvement called for in claim 5 wherein said anchor members comprise studs extending outwardly from and perpendicular to said wall of the housing.

7. The improvement called for in claim 6 wherein the support bars are apertured to receive said studs.

8. The improvement called for in claim 7 wherein the means for mounting the guide rails on said support bars comprise a plurality of studs spaced vertically on each of said support bars and extending in a direction horizontally outwardly from said wall of the housing and beyond the outer ends of said work supports on said vertical run of the chain, said tie bar means being connected with the outer ends of the last-mentioned studs.

9. The improvement called for in claim 8 wherein the first-mentioned studs are located laterally outwardly of the second-mentioned studs.

10. The improvement as called for in claim 9 wherein said guide rails are mounted on said second-mentioned studs intermediate the ends thereof.

11. The improvement as called for in claim 10 wherein said support bars are spaced outwardly from said wall of the housing.

12. The improvement as called for in claim 10 wherein said fastener members comprise spacer means extending between said support bars and said wall of the housing, said support bars being mounted on said spacer means and being spaced outwardly from said wall of the housing.

13. The improvement as called for in claim 1 wherein said fastening members comprise a plurality of spacers on said housing extending outwardly from said wall thereof, said support bars being mounted on the outer ends of said spacers.

14. The improvement called for in claim 13 wherein said spacers are fixedly mounted on said wall of the housing and have studs projecting outwardly from the outer ends thereof, said support bars being mounted on said studs.

15. The improvement called for in claim 1 wherein chuting for conveying workpieces to the lower end of the elevator and from the upper end of the elevator are mounted on said housing and have open ends positioned adjacent, but spaced laterally from, said guide rail assembly and including inlet and exit chutes extending from the ends of said chuting to said trackway, said inlet and exit chutes being mounted on said support bars and being removable from the housing as part of said guide rail assembly.

* * * * *